(12) United States Patent
Dabral et al.

(10) Patent No.: US 11,528,453 B2
(45) Date of Patent: Dec. 13, 2022

(54) SENSOR FUSION BASED PERCEPTUALLY ENHANCED SURROUND VIEW

(71) Applicant: TEXAS INSTRUMENTS INCORPORATED, Dallas, TX (US)

(72) Inventors: Shashank Dabral, Allen, TX (US); Aishwarya Dubey, Plano, TX (US); Martin Fritz Mueller, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/115,378

(22) Filed: Dec. 8, 2020

(65) Prior Publication Data

US 2021/0092327 A1    Mar. 25, 2021

Related U.S. Application Data

(63) Continuation of application No. 16/691,218, filed on Nov. 21, 2019, now Pat. No. 10,897,600, and a
(Continued)

(51) Int. Cl.
*H04N 7/18* (2006.01)
*G06T 7/174* (2017.01)
(Continued)

(52) U.S. Cl.
CPC ........... *H04N 7/181* (2013.01); *G06T 1/0007* (2013.01); *G06T 7/174* (2017.01); *G06T 7/70* (2017.01);
(Continued)

(58) Field of Classification Search
CPC .. H04N 5/23229; H04N 1/2129; H04N 7/181; H04N 2201/0084; G06T 7/70;
(Continued)

(56) References Cited

U.S. PATENT DOCUMENTS 9,508,014 B2    11/2016    Lu et al.
9,533,618 B2    1/2017    Zhang et al.
(Continued)

FOREIGN PATENT DOCUMENTS

DE    102017002626 A1    9/2017
WO    WO 2017/120506 A1    7/2017

OTHER PUBLICATIONS

Vikram Appia et al.; Surround View Camera System for ADAS on TI's TDAx SoCs; Oct. 2015; 18 pages.
(Continued)

*Primary Examiner* — Richard T Torrente
(74) *Attorney, Agent, or Firm* — Carl G. Peterson; Charles A. Brill; Frank D. Cimino

(57) ABSTRACT

Techniques including obtaining a first location of a vehicle, the vehicle having two or more cameras disposed about the vehicle, each camera associated with a physical camera pose, capturing, by a first camera, a first image of a first area in a first field of view, associating the first image with the first location of the vehicle when the first image was captured, moving the vehicle in a direction so that the first area is in an expected second field of view of a second camera, wherein the second camera is not capturing images, obtaining a second location of the vehicle, determining a temporal camera pose based on a first physical camera pose, a second physical camera pose, and the second location of the vehicle, and rendering a view of the first area from the expected second field of view of the second camera based on the first image.

18 Claims, 8 Drawing Sheets

Related U.S. Application Data continuation of application No. 16/690,906, filed on Nov. 21, 2019, now Pat. No. 11,140,364.

(60) Provisional application No. 62/897,581, filed on Sep. 9, 2019.

(51) Int. Cl.
| | | |
|---|---|---|
| *G06T 1/00* | (2006.01) | |
| *G06T 7/70* | (2017.01) | |
| *H04N 1/21* | (2006.01) | |
| *H04N 5/232* | (2006.01) | |
| *B60R 1/00* | (2022.01) | |
| *B60R 11/04* | (2006.01) | |

(52) U.S. Cl.
CPC ....... *H04N 1/2129* (2013.01); *H04N 5/23229* (2013.01); *B60R 1/00* (2013.01); *B60R 11/04* (2013.01); *B60R 2300/105* (2013.01); *B60R 2300/30* (2013.01); *G06T 2207/30244* (2013.01); *G06T 2207/30252* (2013.01); *H04N 2201/0084* (2013.01)

(58) Field of Classification Search
CPC . G06T 2207/30244; G06T 2207/30252; B60R 2300/105; B60R 11/04; B60R 1/00; B60R 2300/30

See application file for complete search history.

(56) References Cited

U.S. PATENT DOCUMENTS

| | | |
|---|---|---|
| 10,210,399 B2 | 2/2019 | Sabeti |
| 10,438,081 B2 | 10/2019 | Kwon et al. |
| 2017/0148136 A1* | 5/2017 | Lee .................... B60R 11/04 |
| 2019/0149774 A1* | 5/2019 | Watanabe ............. H04N 7/181 |
| | | 348/148 |
| 2019/0301886 A1* | 10/2019 | Elangovan ......... G01C 21/3602 |

OTHER PUBLICATIONS

PCT Search Report; PCT/US2020/049639; dated Nov. 20, 2020; 8 pages.

\* cited by examiner

SENSOR FUSION BASED PERCEPTUALLY ENHANCED SURROUND VIEW

CROSS REFERENCE TO RELATED APPLICATIONS

This application is a continuation of U.S. patent application Ser. No. 16/691,218, filed Nov. 21, 2019, which is a continuation of U.S. patent application Ser. No. 16/690,906, filed Nov. 21, 2019, which claims priority to U.S. Provisional Patent Application No. 62/897,581, filed Sep. 9, 2019, the subject matter of which are incorporated herein by reference.

BACKGROUND

Increasingly, vehicles, such as cars, airplanes, robots, etc., are being equipped with multiple external cameras to provide to the operator of the vehicle external views of the area surrounding the vehicle. These external views are commonly used to help maneuver the vehicle, such as when backing up or parking a car. Multiple camera views may be stitched together to form an external surround view around the vehicle. However, external views of areas which are not within a field of view of any cameras of such systems may not be available. Additionally, generating these multi-camera views requires multiple cameras, failure of one or more cameras can hinder operations of such systems. Therefore, it is desirable to have an improved technique for sensor fusion based perceptually enhanced surround view.

SUMMARY

This disclosure relates to a method, the method including obtaining a first location of a vehicle, the vehicle having two or more cameras disposed about the vehicle, and wherein each camera is associated with a physical camera pose indicating where each camera is located with respect to the vehicle, capturing, by a first camera, a first image of a first area in a first field of view of the first camera, associating the first image with the first location of the vehicle when the first image was captured, moving the vehicle in a direction so that the first area is in an expected second field of view of a second camera, wherein the second camera is not capturing images, obtaining a second location of the vehicle, determining a temporal camera pose based on a first physical camera pose of the first camera, a second physical camera pose of the second camera, and the second location of the vehicle, and rendering a view of the first area from the expected second field of view of the second camera based on the temporal camera pose and the first image.

Another aspect of the present disclosure relates to a non-transitory program storage device including instructions stored thereon to cause one or more processors to obtain a first location of a vehicle, the vehicle having two or more cameras disposed about the vehicle, and wherein each camera is associated with a physical camera pose indicating where each camera is located with respect to the vehicle, receive, from a first camera, a first image of a first area in a first field of view of the first camera, associate the first image with the first location of the vehicle when the first image was captured, obtain a second location of the vehicle after the vehicle has moved in a direction so that the first area is in an expected second field of view of a second camera, wherein the second camera is not capturing images, determine a temporal camera pose based on a first physical camera pose of the first camera, a second physical camera pose of the second camera, and the second location of the vehicle, and render a view of the first area based on the temporal camera pose and the first image.

Another aspect of the present disclosure relates to a system for rendering a view around a vehicle, the system including two or more cameras disposed about the vehicle, wherein each camera is associated with a physical camera pose indicating where each camera is located with respect to the vehicle, a memory, and one or more processors operatively coupled to the memory, and the one or more cameras, wherein the one or more processors are configured to execute non-transitory instructions causing the one or more processors to obtaining a first location of the vehicle, capture, by a first camera, a first image of a first area in a first field of view of the first camera, associate the first image with the first location of the vehicle when the first image was captured, obtain a second location of the vehicle after the vehicle has moved in a direction so that the first area is in an expected second field of view of a second camera, wherein the second camera is not capturing images, determine a temporal camera pose based on a first physical camera pose of the first camera, a second physical camera pose of the second camera, and the second location of the vehicle, and render a view of the first area based on the temporal camera pose and the first image.

It may be understood that while techniques herein are discussed in the context of visible light cameras and determining poses for physical and virtual cameras using a bowl shape, nothing in this disclosure is meant to limit these techniques to such sensors and techniques for determining poses. Rather, the techniques discussed herein are readily applicable across a broad range of sensor devices, including, non-visible light or electromagnetic sensors, including infrared, near infrared, or cameras capable of capturing images across a wide range of electromagnetic frequencies. The techniques discussed here are also further applicable to other ways of determining poses for physical and virtual cameras.

BRIEF DESCRIPTION OF THE DRAWINGS

For a detailed description of various examples, reference will now be made to the accompanying drawings in which.

DETAILED DESCRIPTION

Figure 1A:
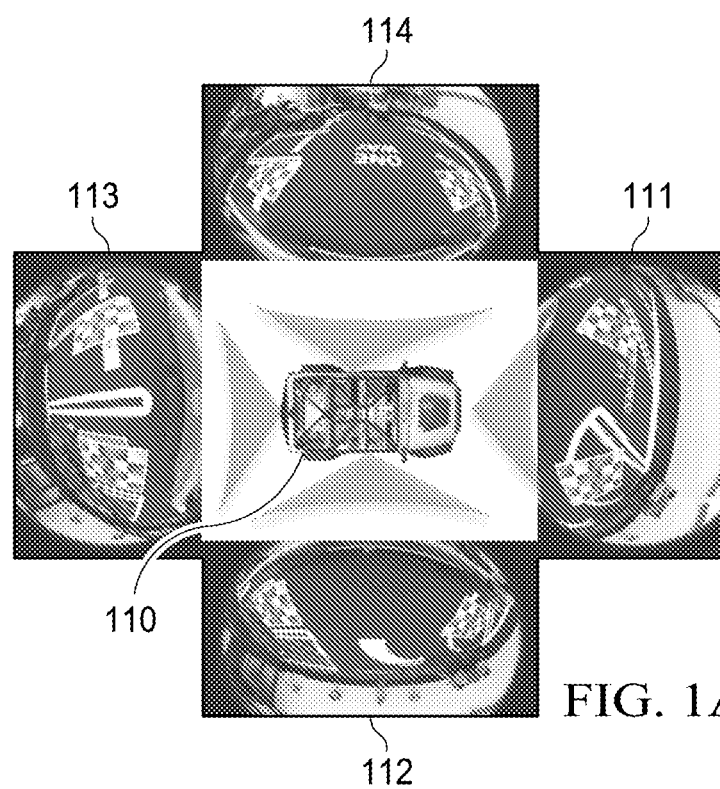
FIGS. 1A and 1B are diagrams illustrating a technique for producing a 2D surround view, in accordance with aspects of the present disclosure.

FIG. 1A is a diagram illustrating a technique for producing a 3D surround view, in accordance with aspects of the present disclosure. The process for producing a 3D surround view produces a composite image from a viewpoint that appears to be located directly above as vehicle looking straight down. In essence, a virtual top view of the neighborhood around the vehicle is provided.

Vehicle surround view systems normally include of four to six fish-eye cameras mounted around a vehicle 110. For example, camera set includes one at the front of the vehicle 110, another at the rear of the vehicle 110, and one on each side of the vehicle 110. Images produced by each camera may be provided to an image signal processing system (ISP) that includes memory circuits for storing one or more frames of image data from each camera. Fish-eye images 111-114 captured by each camera may be conceptually arranged around the vehicle 110, for example.

The general process of producing a surround view from multiple fish eye lens cameras is described in: "Surround view camera system for ADAS on TI's TDAx SoCs," Vikram Appia et al, October 2015, which is incorporated by reference herein. A basic surround view camera solution typically includes two key algorithm components: geometric alignment and composite view synthesis. Geometric alignment corrects the fish-eye distortion for input video frames and converts them to a common birds-eye perspective. The synthesis algorithm generates the composite surround view after geometric correction. To produce a seamlessly stitched surround view output, another key algorithm referred to as "photometric alignment" may be required. Photometric alignment corrects the brightness and color mismatch between adjacent views to achieve seamless stitching. Photometric correction is described in detail, for example, in U.S. patent application Ser. No. 14/642,510, entitled "Method, Apparatus and System for Processing a Display From a Surround View Camera Solution," filed Mar. 9, 2015 which is incorporated by reference herein.

Camera system calibration may include both fish-eye lens distortion correction (LDC) and perspective transformation. For fish-eye distortion correction, a radial distortion model may be used to remove fish-eye from original input frames by applying the inverse transformation of the radial distortion function. After LDC, four extrinsic calibration matrices may be estimated, one for each camera, to transform four input LDC-corrected frames so that all input views are properly registered in a single world co-ordinate system. A chart-based calibration approach may be used. The content of the chart is designed to facilitate the algorithm accurately and reliably finding and matching features. Chart based calibration is discussed in detail, for example, in U.S. patent application Ser. No. 15/294,369 entitled "Automatic Feature Point Detection for Calibration of Multi-Camera Systems," filed Oct. 14, 2016 which is incorporated by reference herein.

Figure 1B:
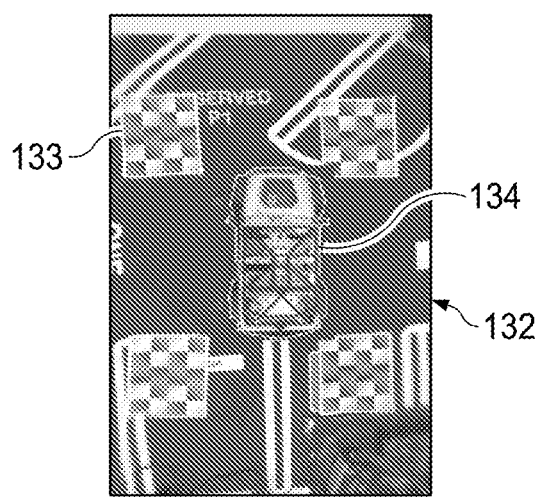

Assuming proper geometric alignment is already applied to the input frames, a composite surround view 132 of FIG. 1B may be produced using, for example, a digital signal processor (DSP). The composite surround view uses data from all four input frames from the set of cameras. The overlapping regions are portions of the frames that come from the same physical world but are captured by two adjacent cameras, i.e., O{m,n}, where m=1, 2, 3, 4, and n=(m+1) mod 4. O{m,n} refers to the overlapping region between view m and view n, and n is the neighboring view of view m in clockwise order. At each location in O{m,n}, there are two pixels available, i.e., the image data from view m and its spatial counterpart from view n.

The calibrated camera system produces a surround view synthesis function which receives input video streams from the four fish-eye cameras and creates a composite 3D surround view 132. A LDC module may perform fish-eye correction, perspective warp, alignment, and bilinear/bicubic interpolation on the image frames from each of the four fish-eye cameras. The LDC module may be a hardware accelerator (HWA) module, for example, and may be incorporate as a part of a DSP module or graphics processing unit (GPU). The DSP module may also performs stitching and may overlay an image of a vehicle, such as vehicle image 134, on the final composite output image 132.

This synthesis creates the stitched output image using the mapping encoded in the geometric LUT. In overlapping regions of the output frame, where image data from two adjacent input frames are required, each output pixel maps to pixel locations in two input images. In the overlapping regions, the image data from the two adjacent images may be blended or a binary decision may be performed to use data from one of the two images.

Regions where no image data is available can result in holes in the stitched output image. For example, the region underneath the vehicle is generally not directly imaged and may appear as a blank or black region in the stitched output image. Typically, this blank region is filled by the overlaid image of the vehicle, such as vehicle image 134. In cases where a camera were to become disabled, the corresponding region normally imaged by that camera may appear as a blank or black region in the stitched output image.

Figure 2:
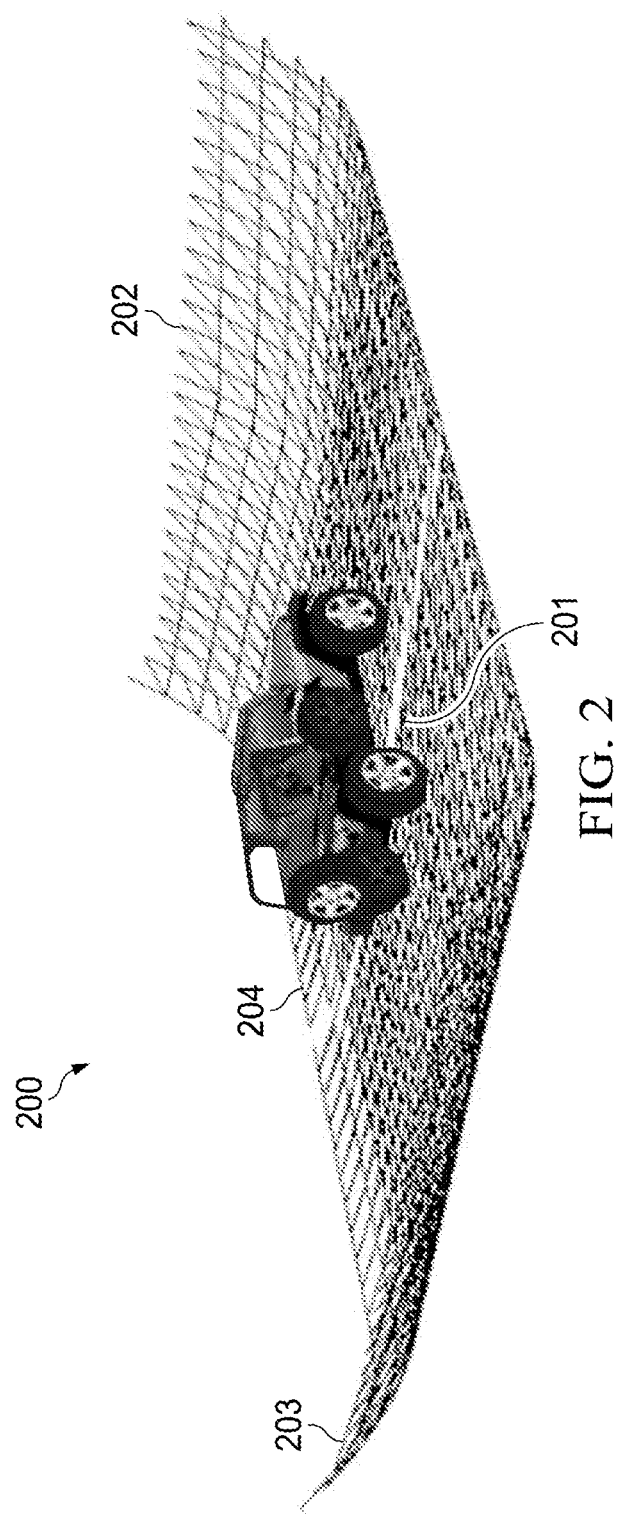
FIG. 2 is an illustration of an example three-dimensional (3D) bowl mesh for use in a surround view system, in accordance with aspects of the present disclosure.

FIG. 2 is an illustration of an example three-dimensional (3D) bowl mesh 200 for use in a surround view system, in accordance with aspects of the present disclosure. For a 3D image, the world around the vehicle may be represented in the shape of a bowl. Due to lack of complete depth of the scene the bowl is a reasonable assumption for the shape of the world around the vehicle. This bowl can be any smooth varying surface. In this particular representation, a bowl 200 is used that is flat 201 in the regions near the car and curved away from the car, as indicated at 202, 203 for the front and back, respectively. In this example, the bowl may curve up only slightly on each side, as indicated at 204. Other bowl shapes may be used on other embodiments.

Images, such as the stitched output image, may be overlaid, for example, by a graphics processing unit (GPU) or image processor, onto the 3D bowl mesh 200 and a set of virtual viewpoints, or virtual cameras, may be defined, along with mappings from the cameras used to create the stitched output image and the virtual viewpoints.

Figure 3:
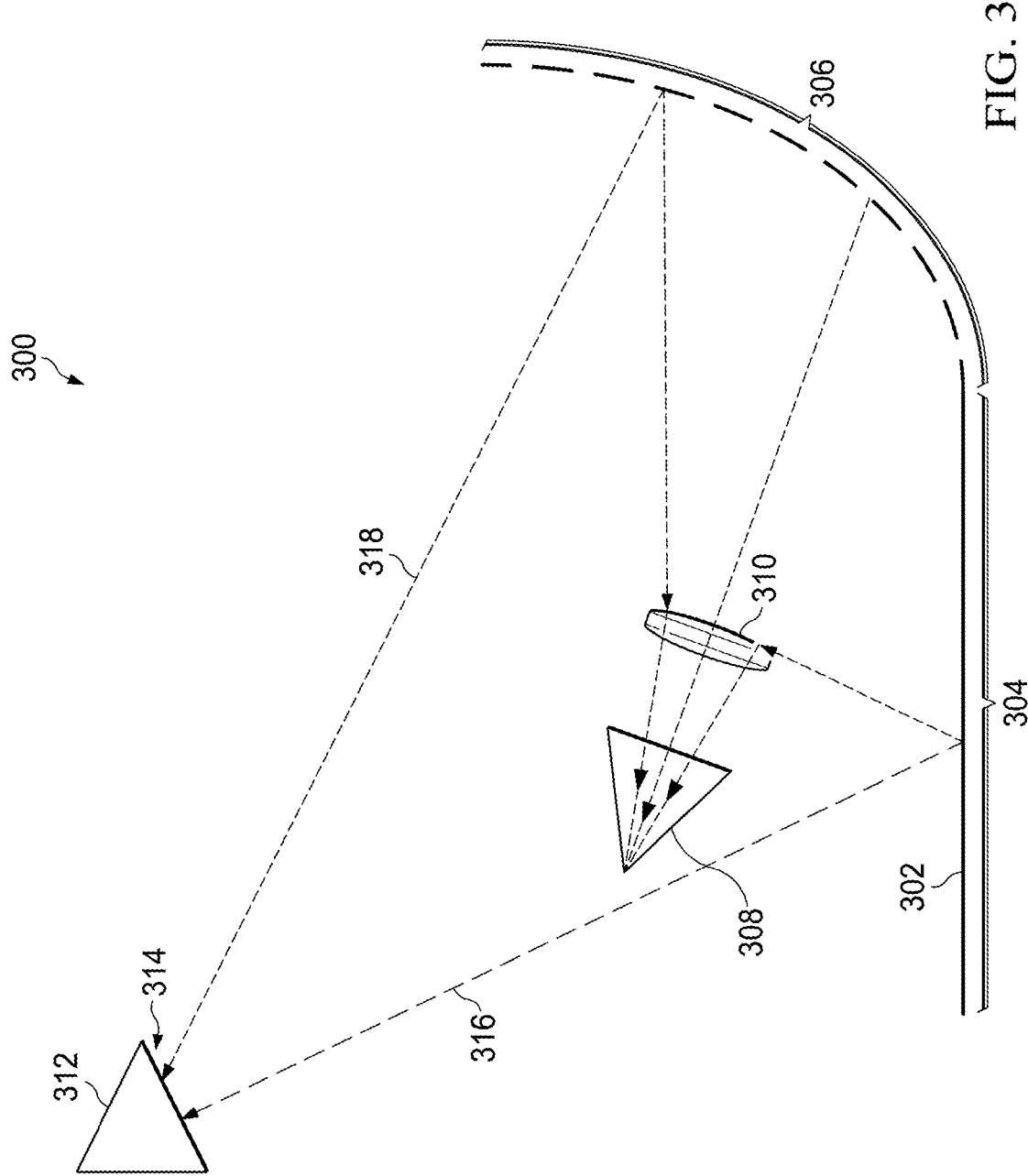
FIG. 3 illustrates a ray tracing process for mapping virtual cameras to physical cameras, in accordance with aspects of the present disclosure.

FIG. 3 illustrates a ray tracing process 300 for mapping virtual cameras to physical cameras, in accordance with aspects of the present disclosure. This example represents a cross sectional view of a portion 302 of a bowl mesh similar to bowl mesh 200 of FIG. 2. Bowl mesh 302 may include a flat portion 304 and a raised portion 306, similar to flat portion 201 and raised portion 202, of FIG. 2. A camera 308 with a fish-eye lens 310 may be mounted on the front of an actual vehicle, as described in more detail above. A virtual viewpoint 312 for an output image may be defined to be, for example, above the actual vehicle location.

An initial calibration of the cameras may be used to provide a mapping of locations in the imaged region, as projected onto the bowl mesh 302 to pixels of the camera 308 with a fish-eye lens 310. This mapping may be prepared, for example, during a calibration phase, and stored, for example, in a look-up table. As discussed above, a virtual viewpoint 312 may be defined at a location separate from the hardware camera 308. A mapping for the virtual viewpoint 312 may be defined by casting a ray from the virtual viewpoint 312 location in the virtual viewpoint image plane 314 and identifying the location that the ray intersects the bowl mesh 302. Rays 316, 318 are examples. Ray 316 intersects flat portion 302 of the bowl mesh 302 and ray 318 intersects the raised portion 306 of the bowl mesh 302, for example. The ray casting operation produces a mapping of every 2D point on the virtual viewpoint image plane 314 with corresponding coordinates of the bowl mesh 302. A mapping between the region visible to the virtual viewpoint 312 and the region visible by camera 308 may then be generated using the mapping between the camera 308 and the bowl mesh 302, along with the mapping between the virtual viewpoint 312 and the bowl mesh 302.

In accordance with aspects of the present discussion, the region visible to the virtual viewpoint 312 may include regions which are not visible by camera 308. In such cases, the mappings for the virtual viewpoint may be based on mappings between multiple cameras and the bowl mesh 302. It may be noted that as the virtual viewpoints can be placed arbitrarily and are not limited to a standard directly above view of the vehicle and surrounding areas. For example, the virtual viewpoint could be defined to be above and slightly behind the vehicle in order to provide a more 3D feel to the view. In addition, in certain cases, the viewpoint may be dynamically moved, for example, by a user. In such cases, mappings may be either recalculated dynamically, or based on a set of recalculated mappings for multiple defined locations. In certain cases, regions that are currently not visible to any camera on the vehicle may have been previously imaged by one or more cameras on the vehicle. A temporal camera capable of providing images of the region may be used. The temporal camera may display images of the region even though the cameras on the vehicle cannot directly image the region. These images of the region may be captured at a previous point in time and may be used to provide images of the region, providing a time dimension to the virtual camera viewpoints.

Figure 4A:
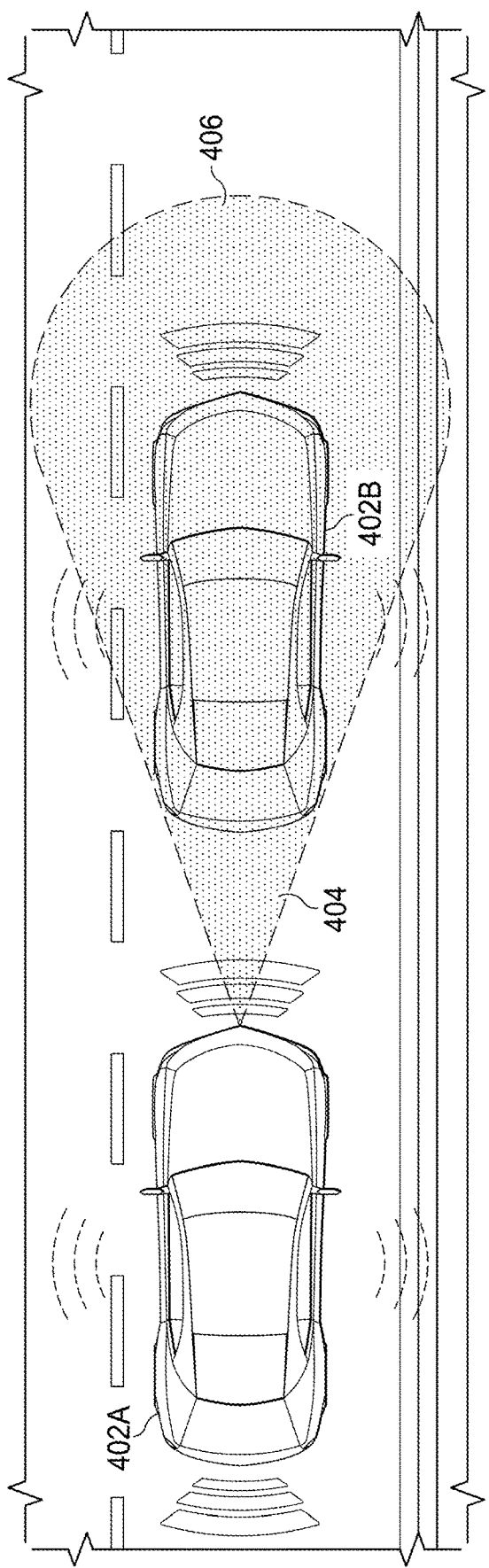
FIGS. 4A and 4B illustrate example effects of temporal mapping, in accordance with aspects of the present disclosure.
Figure 4B:
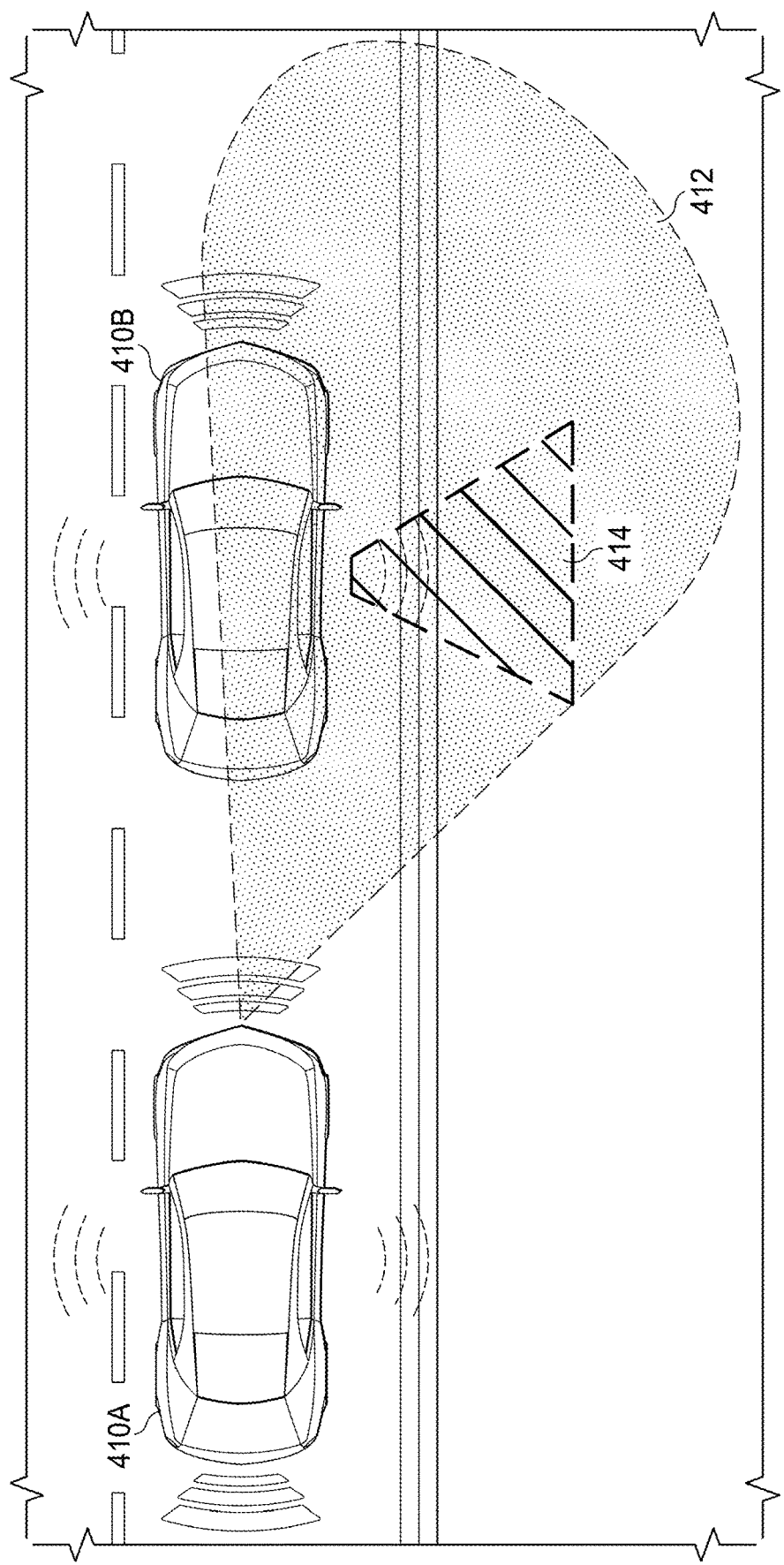

FIGS. 4A and 4B illustrate example effects of temporal mapping, in accordance with aspects of the present disclosure. FIG. 4A illustrates a first example for rendering a view underneath a vehicle and FIG. 4B illustrates a second example for rendering a view where a camera is disabled. As shown in this example, for a moving vehicle, a region that is not visible by a camera on the vehicle at a current point in time, such as $t_1$, may have been visible to the camera on the vehicle at a previous point in time, such as $t_0$. In FIG. 4A, a car 402A at time $t_0$ having a camera pointed in the direction of travel, here forward, is able to image a region 404 ahead of the car 402A, including reference region 406. At time $t_1$, the car 402B has traveled forward enough such that the car 402B is now above the previously imaged region 404 and reference region 406. It should be noted that for clarity the examples provided involve a vehicle with a forward-facing camera and moving forward. However, a person having ordinary skill in the art would understand that other cameras may be used corresponding to the direction of travel, such as a rear-facing camera for reversing.

In FIG. 4B, car 410A again at time $t_0$ having a camera pointed in the direction of travel, here forward, is able to image a region 412 ahead of the car 410A, including reference region 414, corresponding to the field of view of a right-side camera of car 410B. At time $t_1$, the car 410B has traveled forward enough such that region 412 should now be within the field of view of the right-side camera of car 410B. In this case, right camera 416 is disabled and images are not being received from the right-side camera. While reference region 414 cannot be directly imaged by cameras on car 410B at time $t_1$, reference region 414 was previously imaged at a previous point in time, such as $t_0$. Thus, a time dimension may be added to the mappings as between the virtual viewpoint and one or more camera views.

In accordance with aspects of the present disclosure, one or more history buffers may be provided to store images captured by one or more cameras positioned about a vehicle. For example, a separate history buffer may be provided for each camera, or a central history buffer may be provided for some or all of the cameras. In certain cases, the history buffer may be sufficiently large to buffer images for a set timeframe and/or distance for the one or more cameras supported by the history buffer. This history buffer may be used to provide images for a temporal camera in a way similar to live camera images for a virtual camera.

Figure 5:
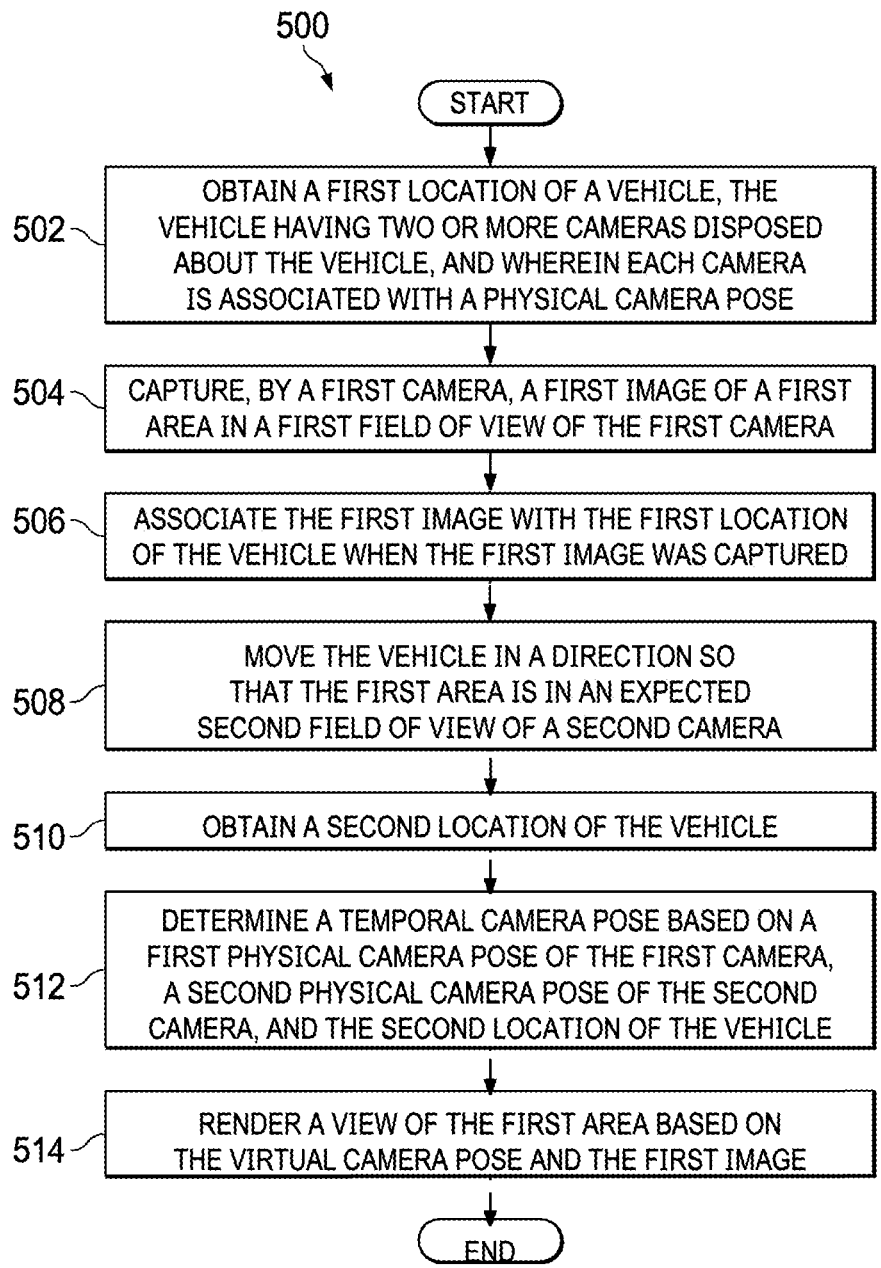
FIG. 5 is a is a flow chart illustrating a technique for enhanced surround view, in accordance with aspects of the present disclosure.

FIG. 5 is a flow chart 500 illustrating a technique for enhanced surround view, in accordance with aspects of the present disclosure. At step 502, the method starts by obtaining a first location of a vehicle, the vehicle having two or more cameras disposed about the vehicle, and wherein each camera is associated with a physical camera pose indicating where each camera is located with respect to the vehicle. Generally, a vehicle includes one or more camera, such as a camera in the front, right side, left side, and back of the vehicle, configured to capture images of areas around the vehicle. Each camera is associated with a physical pose indicating the location and direction of the camera. In certain cases, location information may be obtained by any known technique, such as by using Global Position System (GPS) coordinates. In certain cases, these GPS coordinates may be supplemented by additional sensors, such as accelerometers or other inertial sensors. At step 504, the method includes capturing, by a first camera, a first image of a first area in a first field of view of the first camera. For example, the cameras disposed about the vehicle may capture a stream of images of the areas around the vehicle. In certain cases, one or more of these cameras may be fish eye cameras and have been calibrated such that images from multiple cameras may be stitched together to generate a surround view of the vehicle. For example, the images may be projected to a bowl mesh and one or more virtual cameras used to generate the surround view of the vehicle.

At step 506, the method includes associating the first image with the first location of the vehicle when the first image was captured. For example, as images are captured by the cameras, the images are associated with the current location of the vehicle. The current location of the vehicle may be determined, for example, based in part on GPS and may be supplemented by INS information, augmented GPS information, additional satellite based location systems such as Galileo and GLObal NAvigation Satellite System (GLO-NASS), etc. These captured images and associated locations may be stored in an image or temporal buffer. The temporal buffer may be a single temporal buffer shared by one or more cameras, or multiple temporal buffers for the cameras may be provided, such as a temporal buffer for each camera. The multiple temporal buffers may be interconnected. In certain cases, images in the temporal buffer may be stored in temporal order and images stored may be based on one or more threshold distances between the location of the vehicle associated with the image and a location of the vehicle associated with another image already stored in the temporal buffer. In certain cases, multiple images stored in the temporal buffer may be used to render portions of a single image for display. For example, resolution for fish eye cameras may drop off relatively rapidly over a distance. To mitigate this reduced resolution, multiple stored images may be combined to render a single image. As a more specific example, as images are stored with associated locations, when displaying a view underneath a vehicle, a first portion, such as a first one-third of the region underneath the vehicle may be displayed using a temporal image captured from a first distance to that first one-third of the region. A second one-third of the region may be displayed using a second temporal image captured from a second distance to the second one-third, the second distance adjacent, but just after the first one-third of the region. The third, one-third of the region may be similarly displayed using a third temporal image captured from a third distance to the third one-third, the third distance adjacent, but just after the second one-third of the region.

In certain cases, images may be stored in the temporal buffer based on the vehicle direction of travel. For example, if the vehicle is traveling substantially in a forward direction, images from a forward-facing camera may be stored in the temporal buffer, while images from a rear facing camera are not stored. Conversely, if the vehicle is travelling substantially in a rearward direction, images from the rear-facing camera may be stored in the temporal buffer, while images from the forward-facing camera are not stored. In certain cases, images may be removed from the temporal buffer based on a maximum distance between the location of the vehicle associated with the image in the temporal buffer and the current location of the vehicle.

At step 508, the method includes moving the vehicle in a direction such that the first area is no longer within a field of view of the first camera. In a first example, the vehicle may be moved such that the first area is underneath the vehicle. In a second example, the vehicle may be moved in a direction such that the first area is not substantially in a field of view of the first camera, but is in an expected field of view of a second camera. In this second example, the second camera is disabled or otherwise unavailable and thus the first area cannot be viewed by the second camera. In certain cases, it is possible that the second camera could be replaced entirely by the virtual camera. For example, a vehicle may include front and rear cameras to capture views of an area and a temporal virtual camera used to provide views of the left and right sides of the vehicle. In certain cases, a viewing angle or area in view of the temporal camera may be adjusted as compared to the expected field of view of the second camera, as an image quality of another camera may be more limited at the edges of the region imaged by the other camera, for example due to lens distortion, fish-eye lens, etc., and the view provided by the temporal virtual camera may have a reduced resolution, region imaged, and/or range. Adjusting the viewing angle or area in view of the temporal camera helps reduce the effect of the reduced imaging quality. At step 510, a second location of the vehicle is obtained.

At step 512, the method includes determining a temporal camera pose based on a first physical camera pose of the first camera, a second physical camera pose of the second camera, and the second location of the vehicle. For example, as discussed further below, the temporal camera pose may be based on a pre-calibrated physical camera pose of the first camera and the second camera, and a change in pose of the vehicle. Images stored in the temporal buffer may be selected, for example, based on the current location of the vehicle as well as a threshold distance between the current location of the vehicle and the location of the vehicle associated with the selected image.

At step 514, the method includes rendering a view of the first area from the expected second field of view of the second camera based on the virtual camera pose and the first image. In certain cases, the selected image from the temporal buffer may be projected to a bowl mesh. A view from the temporal camera may be determined as a temporal image and this temporal image may be rendered to a display, for example, within the vehicle. In certain cases, images selected from the temporal buffer and projected to the bowl mesh may be stitched together to form a composite temporal image. The view from the temporal camera may be based on the composite temporal image.

To help generate a synthesized, historical view of a region that was previously imaged by a camera on the vehicle, a pose for the temporal camera may be determined. In certain cases, information related to the change in pose of the vehicle may be obtained using a combination of GPS and an Inertial Measurement Unit (IMU). For example, GPS location information may be provided by an augmented GPS and combined with rotation/translation information provided by an accelerometer, or other inertia sensor, to determine the pose of the vehicle at a certain time. This pose information may be associated with images stored in the history buffer.

Figure 6:
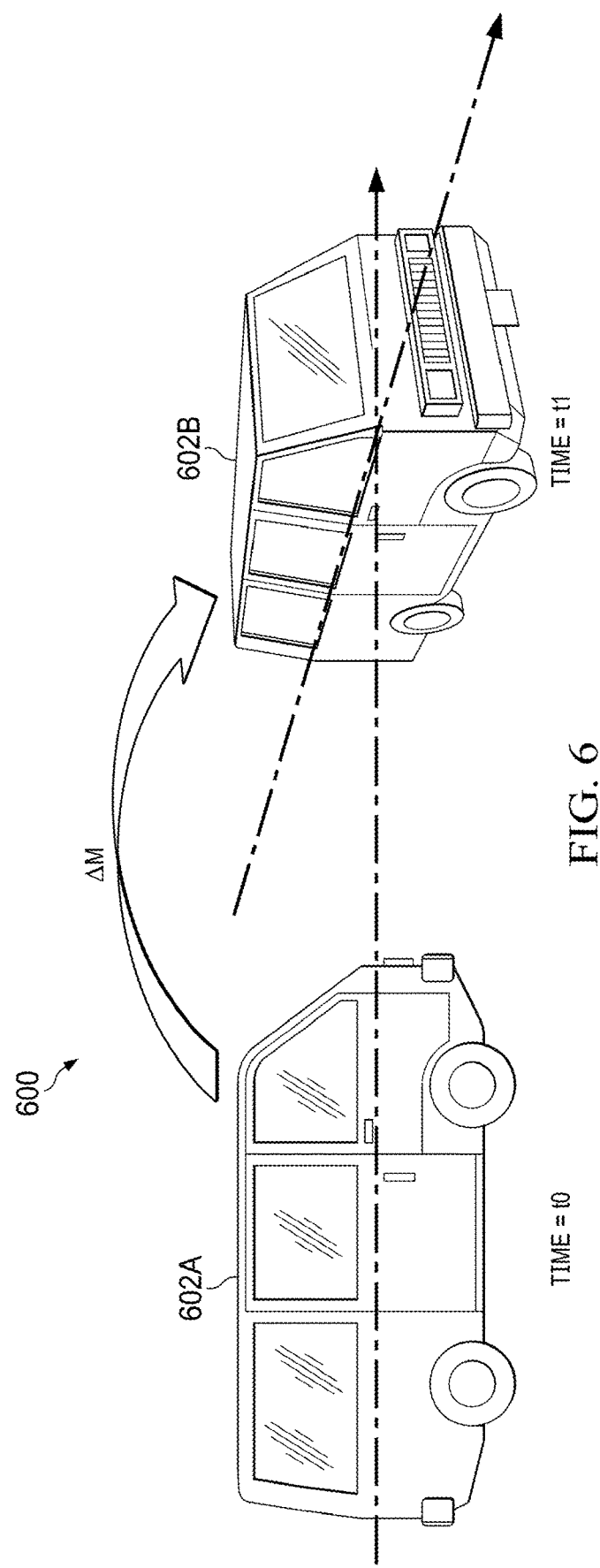
FIG. 6 illustrates an example change in pose of a vehicle, in accordance with aspects of the present disclosure.

FIG. 6 illustrates an example change in pose 600 of a vehicle, in accordance with aspects of the present disclosure. Generally, a pose refers to the position and orientation of a real or virtual object with respect to a coordinate system and is described in the form of a M matrix. In this example, a vehicle 602A having a first pose at time $t_0$, moves into a second pose, at time $t_1$, where the vehicle 602B has a second pose, that differs in multiple dimensions from the first pose. To handle the change in pose of the vehicle, the pose of the temporal camera may be based on a change in pose of the vehicle with respect to the previous time. This change in the pose of the vehicle may be described by $\Delta M$ and may be based on changes in location, rotation, and/or translation of the vehicle. Thus, the pose of the temporal camera may be described by the formula $$^{FC(t_0)}M_{W(t_1)} = {}^{FC(t_0)}M_{FC(t_1)} \times {}^{FC(t_1)}M_{W(t_1)},$$

where FC represents the pose of the front camera, and W represents a world coordinate system, such as coordinates of a bowl mesh, at a particular point in time, and where $$^{FC(t_0)}M_{FC(t_1)}$$

is provided by the $\Delta M$, and $$^{FC(t_1)}M_{W(t_1)}$$

is provided by the camera calibration. Once a relative pose of the temporal camera is determined, the relative pose may be used as a pose for a virtual camera using corresponding images stored in the history buffer.

Inconsistent selection of images from the historical buffer can cause issues with respect to temporal consistency, flickering, or other artifacts. To help determine the correct image from the history buffer to use for the temporal camera, a distance threshold may be used. In certain cases, a threshold distance from a camera for the temporal camera may be defined. For example, a threshold distance of five meters away from the location of a front camera of a vehicle may be defined for use with the temporal camera. In certain cases, images in the history buffer may be arranged in temporal order. When selecting an image from the history buffer, the translation component of the pose of each image may be examined, starting from the earliest, to determine whether the image was taken from a distance greater than the threshold distance. If the image was not taken from a distance greater than the threshold distance, then the next image is examined until the first image with a distance greater than the threshold distance is found. The first image with a distance greater than the threshold distance may be selected as the image for use with the temporal camera.

To help maintain image consistency, in certain cases, images stored in the temporal buffer may be removed based on direction changes of the vehicle. For example, if a vehicle travelling in reverse stops and then starts moving in a forward direction, the images stored in the temporal buffer for the reverse facing camera may be removed and new images from the forward-facing camera may be stored in the temporal buffer. This helps keep the images stored in the temporal buffer current as objects may have shifted locations while the vehicle moved in the other direction. Similarly, if the vehicle has remained stationary for a certain threshold amount of time, the temporal buffer may be cleared as objects may have shifted. To convey this to the vehicle operator, a transparency of a model, such as vehicle image 134 of FIG. 1, may be reduced to make the model opaquer as the temporal buffer is invalidated. Transparency of the model may be increased to make the model less opaque as images are stored in the temporal buffer to generate a view of the region imaged by the temporal camera.

In accordance with aspects of the present disclosure, a buffer optimization scheme may be used to limit the number of images stored in the history buffer. Storing every possible image frame in the history buffer would likely not be needed, for example if a vehicle is travelling slowly, and may quickly fill the history buffer. To help reduce the number of images that need to be stored, images from the cameras may be stored into the history at discrete distance frequency thresholds. For example, where the distance frequency threshold is set to ten centimeters, an image from the cameras may only be stored in the history buffer if a translation associated with the image is greater than ten centimeters from the most recently stored image.

In certain cases, a maximum distance for which to store images may also be set. For example, the image buffer may be configured to store images for a maximum threshold distance, such as five meters, past the minimum threshold distance. A maximum number of images per camera supported by the image buffer may then be calculated and the image buffer sized appropriately. For example, where the image buffer is configured to store images associated with a maximum threshold distance of 5 meters with a minimum threshold distance between images of ten centimeters, then maximum number of images that can be stored in the history buffer per camera is 50 images.

Figure 7:
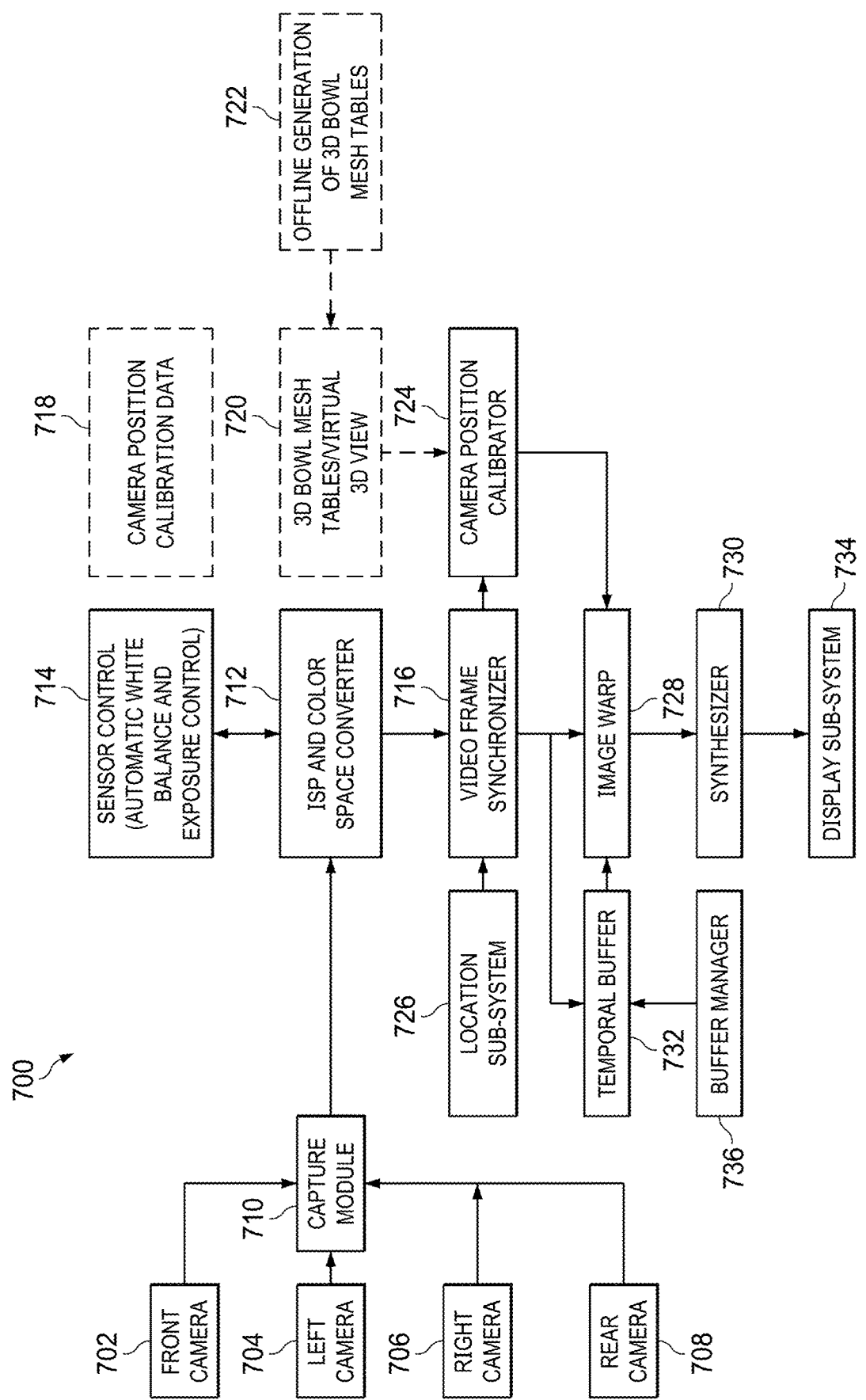
FIG. 7 is a block diagram of an embodiment of a system, in accordance with aspects of the present disclosure.

FIG. 7 is a block diagram of an embodiment of a system 700, in accordance with aspects of the present disclosure. This example system 700 includes multiple cameras, such as cameras 700-708 that are placed around the periphery of the vehicle and coupled to a capture block 710. Block 712 may perform color corrections operations (such as conversion from Bayer format to YUV420 format, color tone mapping, noise filter, gamma correction, etc.) if required, using known or later developed image processing methods. Block 714 may perform automatic exposure control of the video sensors and white balance to achieve optimal image quality using known or later developed techniques. Block 716 synchronizes all the cameras 700-708 to ensure that each frame captured from the sensor is in same time period. In certain cases, location information, provided by location sub-system 726, may be associated with the synchronized frames captured by the cameras. The location sub-system may comprise, for example a GPS sensor along with other sensors, such as inertial or acceleration sensors. Synchronized frames may be stored in the temporal buffer 732. A buffer manager 736 may manage the images stored in the temporal buffer 732, such as by performing thresholding to determine whether to store certain images, removing images based on a distance and direction of travel of the vehicle, amount of time stationary, etc., and managing from which camera images are being stored into the temporal buffer 732. In certain cases, the temporal buffer may be optimized to store only images from the front and rear-facing cameras.

A mapping lookup table produced by calibrator 724 can be used by warp module 728 to warp input video frames provided directly by the cameras 702-708 along with images stored in the temporal buffer 732 based on virtual and temporal cameras. Thus, fisheye distortion correction and viewpoint warping may both be performed in a single operation using the predetermined viewpoint mappings.

Synthesizer module 730 is responsible for generation of a composite video frame that includes one frame from each video channel. Depending on the virtual viewpoint the composition parameters can change. This module is similar to the synthesis block described above with regard to FIG. 1. In place of the fish-eye input images, synthesizer module 730 receives the warp modified output for each camera image from the warp module 728.

The synthesizer block 730 may stitch and blend images corresponding to adjacent cameras and temporal cameras. The blending location will vary based on the location of the virtual view and this information may also be encoded in the offline generated world to view meshes.

A display sub-system 734 may receive the video stream output from synthesizer 730 and display the same on a connected display unit for viewing by a driver of the vehicle, such as an LCD, Monitor, TV, etc. The system may be configured to also display meta data such detected object, pedestrians, warnings, etc.

In the particular implementation described herein, four cameras are used. The same principals disclosed herein may be extended to N cameras in other embodiments, where N may be greater or less than four.

Camera calibration mapping data 718 may be generated by the calibration procedure in combination with the world to view meshes and stored in a 3d bowl mesh table 720. As described above in more detail, the world view meshes 720 may be generated offline 722 and stored for later use by the calibrator module 724.

For each predefined virtual view point, calibrator module 724 reads the associated 3D bowl mesh table 720, accounts for camera calibration parameters 718 and generates a 2D mesh lookup table for each of the four channels. This is typically a onetime operation and done when the system is started, such as when the system is placed in a vehicle during an assembly process, for example. This process may be repeated whenever a position change is sensed for one of the cameras mounted on the vehicle. Thus, the 3D bowl mesh table 720 may be generated for each frame for the temporal camera as the calibration of the temporal camera changes each frame as the vehicle moves. In some embodiments, the calibration process may be repeated each time a vehicle is started, for example.

In certain cases, captured image data from a camera may not be valid for use in conjunction with a temporal buffer. For example, where a vehicle, such as a car, is travelling in congested traffic, the captured images from the camera may include images of other vehicles. Such images would be inappropriate, as an example, for use with a temporal camera displaying images of a region underneath the vehicle. In such cases, the temporal camera may be disabled, for example, by making a model of the vehicle opaque when the captured images include objects that render their use for the temporal camera invalid. Transparency of the model may be increased to make the model less opaque once images are capture and stored in the temporal buffer which do not include such objects. Objects in the captured images may be detected and identified using any known technique.

Figure 8:
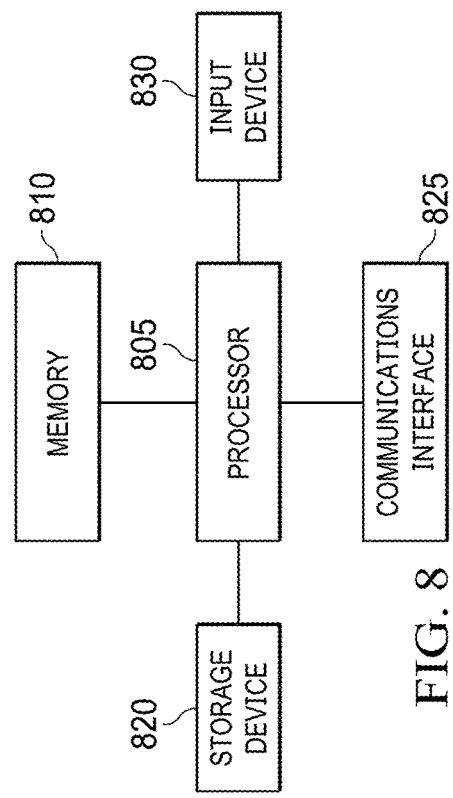
FIG. 8 is a block diagram of an embodiment of a computing device, in accordance with aspects of the present disclosure.

As illustrated in FIG. 8, device 800 includes a processing element such as processor 805 that contains one or more hardware processors, where each hardware processor may have a single or multiple processor cores. Examples of processors include, but are not limited to a central processing unit (CPU) or a microprocessor. Although not illustrated in FIG. 8, the processing elements that make up processor 805 may also include one or more other types of hardware processing components, such as graphics processing units (GPUs), application specific integrated circuits (ASICs), field-programmable gate arrays (FPGAs), and/or digital signal processors (DSPs). In certain cases, processor 805 may be configured to perform the tasks described in conjunction with modules 710-716, 724-730 of FIG. 7.

FIG. 8 illustrates that memory 810 may be operatively and communicatively coupled to processor 805. Memory 810 may be a non-transitory computer readable storage medium configured to store various types of data. For example, memory 810 may include one or more volatile devices such as random access memory (RAM). In certain cases, the temporal buffer 730 of FIG. 7 may be part of the memory 810. Non-volatile storage devices 820 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 820 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800. Storage 820 may be partitioned or split into multiple sections that may be accessed by different software programs. For example, storage 820 may include a section designated for specific purposes, such as storing program instructions or data for updating software of the computing device 800. In one embodiment, the software to be updated includes the ROM, or firmware, of the computing device. In certain cases, the computing device 800 may include multiple operating systems. For example, the computing device 800 may include a general-purpose operating system which is utilized for normal operations. The computing device 800 may also include another operating system, such as a bootloader, for performing specific tasks, such as upgrading and recovering the general-purpose operating system, and allowing access to the computing device 800 at a level generally not available through the general-purpose operating system. Both the general-purpose operating system and another operating system may have access to the section of storage 820 designated for specific purposes.

The one or more communications interfaces may include a radio communications interface for interfacing with one or more radio communications devices. In certain cases, elements coupled to the processor may be included on hardware shared with the processor. For example, the communications interfaces 825, storage, 820, and memory 810 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc. Processed input, for example from the radar device 830, may be output from the computing device 800 via the communications interfaces 825 to one or more other devices.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

While a conventional vehicle with an onboard driver has been described herein, other embodiments may be implemented in vehicle in which the "driver" is remote from the vehicle, such as autonomous vehicles that may be controlled from a remote site.

As use herein, the term "vehicle" may also be applied to other types of devices, such as robots, industrial devices, medical devices, etc. in which low cost, low power processing of images from multiple cameras to form a virtual viewpoint in real time is beneficial.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), a digital signal processor (DSP), etc. The software that executes the techniques may be initially stored in a computer-readable medium such as compact disc (CD), a diskette, a tape, a file, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A method, comprising:
   obtaining a first location of a vehicle;
   capturing, by a first camera disposed on the vehicle, a first image of a first area in a first field of view of the first camera;
   associating the first image with the first location of the vehicle when the first image was captured;
   storing the first image of the first area in an image buffer;
   obtaining a second location of the vehicle;
   capturing, by the first camera, a second image of a second area that at least partially overlaps with the first area;
   associating the second image with the second location of the vehicle when the second image was captured;
   storing the second image of the second area in the image buffer;
   obtaining a third location of the vehicle after the vehicle has moved in a direction so that the first area is in an expected second field of view of a second camera disposed on the vehicle, wherein the second camera is not capturing images;
   determining, based on the first location, a first physical camera pose of the first camera when the first image was captured;
   determining, based on the second location, a second physical camera pose of the first camera when the second image was captured; and
   rendering a view of the first area based on the first physical camera pose, the second physical camera pose, the third location, the first image stored in the image buffer, and the second image stored in the image buffer.

2. The method of claim 1, wherein the first field of view of the first camera does not overlap with a second field of view of the second camera.

3. The method of claim 1, wherein the first field of view of the first camera is in a different direction from a second field of view of the second camera.

4. The method of claim 1, wherein rendering the view comprises repeating the steps of:
   choosing a candidate image from the image buffer; and
   determining a distance between a current location of the vehicle and a location of the vehicle associated with the chosen candidate image;
   selecting the chosen candidate image if the distance is greater than or equal to a minimum threshold distance; and
   rendering the view based on the selected candidate image.

5. The method of claim 1, further comprising:
   deleting an expired image from the image buffer based on a determination that a location of the vehicle associated with the candidate image and a current location of the vehicle is greater than a maximum distance threshold.

6. The method of claim 1, further comprising capturing, by a third camera, a third image of the first area; and wherein rendering the view of the first area is further based on the third image of the first area.

7. A non-transitory program storage device comprising instructions stored thereon to cause one or more processors to:
   obtain a first location of a vehicle;
   receive, from a first camera disposed on the vehicle, a first image of a first area in a first field of view of the first camera;
   associate the first image with the first location of the vehicle when the first image was captured;
   store the first image of the first area in an image buffer;
   obtain a second location of the vehicle;
   capture, by the first camera, a second image of a second area that at least partially overlaps with the first area;
   associate the second image with the second location of the vehicle when the second image was captured;
   store the second image of the second area in the image buffer;
   obtain a third location of the vehicle after the vehicle has moved in a direction so that the first area is in an expected second field of view of a second camera disposed on the vehicle, wherein the second camera is not capturing images;
   determine, based on the first location, a first physical camera pose of the first camera when the first image was captured;
   determine, based on the second location, a second physical camera pose of the first camera when the second image was captured; and
   render a view of the first area based on the first physical camera pose, the second physical camera pose, the third location, the first image stored in the image buffer, and the second image stored in the image buffer.

8. The non-transitory program storage device of claim 7, wherein the first field of view of the first camera does not overlap with a second field of view of the second camera.

9. The non-transitory program storage device of claim 7, wherein the first field of view of the first camera is in a different direction from a second field of view of the second camera.

10. The non-transitory program storage device of claim 7, wherein the stored instructions to render the view further cause the one or more processors to repeat the steps of:
    choose a candidate image from the image buffer; and
    determine a distance between a current location of the vehicle and a location of the vehicle associated with the chosen candidate image;
    select the chosen candidate image if the distance is greater than or equal to a minimum threshold distance; and
    render the view based on the selected candidate image.

11. The non-transitory program storage device of claim 7, wherein the stored instructions further cause the one or more processors to:
    delete an expired image from the image buffer based on a determination that a location of the vehicle associated with the candidate image and a current location of the vehicle is greater than a maximum distance threshold.

12. The non-transitory program storage device of claim 7, wherein the stored instructions further cause the one or more processors to:

capture, by a third camera, a third image of the first area; and wherein rendering the view of the first area is further based on the third image of the first area.

13. A system for rendering a view around a vehicle, the system comprising:
a first camera disposed on the vehicle;
a second camera disposed on the vehicle;
a memory; and
one or more processors operatively coupled to the memory, and the one or more cameras, wherein the one or more processors are configured to execute non-transitory instructions causing the one or more processors to:
obtain a first location of the vehicle;
capture, by the first camera, a first image of a first area in a first field of view of the first camera;
associate the first image with the first location of the vehicle when the first image was captured;
store the first image of the first area in an image buffer;
obtain a second location of the vehicle;
capture, by the first camera, a second image of a second area that at least partially overlaps with the first area;
associate the second image with the second location of the vehicle when the second image was captured;
store the second image of the second area in the image buffer;
obtain a third location of the vehicle after the vehicle has moved in a direction so that the first area is in an expected second field of view of the second camera, wherein the second camera is not capturing images;
determine, based on the first location, a first physical camera pose of the first camera when the first image was captured;
determine, based on the second location, a second physical camera pose of the first camera, and when the second image was captured; and
render a view of the first area based on the first physical camera pose, the second physical camera pose, the third location, the first image stored in the image buffer, and the second image stored in the image buffer.

14. The system of claim 13, wherein the first field of view of the first camera is in a different direction from a second field of view of the second camera.

15. The system of claim 13, wherein the first field of view of the first camera does not overlap with a second field of view of the second camera.

16. The system of claim 13, wherein the non-transitory instructions, when executed by the one or more processors, cause the one or more processors to render the view by at least repeating the steps of:
choosing a candidate image from the image buffer; and
determining a distance between a current location of the vehicle and a location of the vehicle associated with the chosen candidate image;
selecting the chosen candidate image if the distance is greater than or equal to a minimum threshold distance; and
rendering the view based on the selected candidate image.

17. The system of claim 13, wherein the non-transitory instructions, when executed by the one or more processors, further cause the one or more processors to delete an expired image from the image buffer based on a determination that a location of the vehicle associated with the candidate image and a current location of the vehicle is greater than a maximum distance threshold.

18. The system of claim 13, wherein the non-transitory instructions, when executed by the one or more processors, further cause the one or more processors to capture, by a third camera, a third image of the first area,
wherein the non-transitory instructions, when executed by the one or more processors, cause the one or more processors to render the view by at least rendering the view of the first area based on the third image of the first area.

* * * * *